(12) United States Patent
Foster et al.

(10) Patent No.: US 8,899,518 B2
(45) Date of Patent: Dec. 2, 2014

(54) ENGINE DEBRIS GUARD (75) Inventors: Chris Foster, Bristol (GB); Ching Yu Hui, Bristol (GB)

(73) Assignee: Airbus Operations Limited, Bristol (GB)

( * ) Notice: Subject to any disclaimer, the term of this patent is extended or adjusted under 35 U.S.C. 154(b) by 145 days.

(21) Appl. No.: 13/127,616

(22) PCT Filed: Nov. 11, 2008

(86) PCT No.: PCT/GB2008/051031
§ 371 (c)(1),
(2), (4) Date: May 4, 2011

(87) PCT Pub. No.: WO2010/052447
PCT Pub. Date: May 14, 2010

(65) Prior Publication Data
US 2011/0215196 A1 Sep. 8, 2011

(51) Int. Cl.
B64C 25/00 (2006.01)
B64C 25/32 (2006.01)

(52) U.S. Cl.
CPC .................................... B64C 25/32 (2013.01)
USPC ....................................... 244/100 R; 244/121

(58) Field of Classification Search
CPC ................................. B64C 25/16; B64C 7/00
USPC ......................................................... 244/121
See application file for complete search history.

(56) References Cited

U.S. PATENT DOCUMENTS

| | | | |
|---|---|---|---|
| 2,653,846 A * | 9/1953 | Wiley | 298/1 SG |
| 2,814,454 A | 11/1957 | Atkins et al. | |
| 3,670,996 A | 6/1972 | Jenny | |
| 4,258,929 A * | 3/1981 | Brandon et al. | 280/851 |
| 4,352,502 A * | 10/1982 | Leonard et al. | 280/851 |
| 4,408,736 A * | 10/1983 | Kirschbaum et al. | 244/100 R |
| 4,681,285 A * | 7/1987 | Bowdy et al. | 244/103 R |
| 5,058,827 A * | 10/1991 | Dansereau et al. | 244/103 R |
| 7,669,798 B2 * | 3/2010 | Guering et al. | 244/121 |
| 7,946,531 B2 * | 5/2011 | Jackson | 244/121 |
| 2007/0095977 A1 * | 5/2007 | Gabrys | 244/103 R |

FOREIGN PATENT DOCUMENTS

RU 2238223 C1 10/2004

OTHER PUBLICATIONS

International Search Report and Written Opinion for PCT/GB2008/051031 mailed Aug. 4, 2009.
Office Action corresponding to RU 2011120279/11, dated Aug. 17, 2012.
English Translation of Japanese Office Action for Patent Application No. 2011-533805 dispatched.

* cited by examiner

*Primary Examiner* — Isam Alsomiri
*Assistant Examiner* — Justin Benedik
(74) *Attorney, Agent, or Firm* — Lowe Hauptman & Ham, LLP (57) ABSTRACT An engine debris guard for preventing tyre propelled debris striking an aircraft engine, the debris guard comprising a guard bar pivotably connected to an aircraft main landing gear having at least one wheel and tyre assembly, the guard bar being arranged to be movable between a first position and a second position wherein in the first position the guard bar extends laterally across the wheel and tyre assembly to intersect the possible trajectories between the wheel and tyre assembly and an engine of the aircraft of any tyre propelled debris.

28 Claims, 5 Drawing Sheets

ENGINE DEBRIS GUARD

Aircraft designers and manufacturers must take into consideration many potential risks arising from the failure of the aircraft components during the design of a new aircraft. One such risk is the failure of one or more of the wheels and tyres of the main landing gear of the aircraft. A tyre failure can occur simply as a result of tyre wear or fatigue or as a result of the tyre striking an object on the runway, particularly when the aircraft is moving at speed on the ground, i.e. during either takeoff or landing. A failure of the aircraft wheel itself will often result in the associated tyre failing. When a tyre fails it generates a certain amount of tyre debris as one or more portions of the tyre disintegrates. When the aircraft is travelling at speed any tyre debris will be flung from the tyre at relatively high speed with a high probability of striking the underside of the aircraft, either the underside of the fuselage or the underside of the wings. Such debris impact has the potential to cause significant damage to the aircraft structure. As a consequence, the underside of the aircraft fuselage and wings generally include areas of increased thickness and strength where tyre debris impact is a possibility to mitigate the damage caused by such impact. The above comments are also applicable to any debris that is already present on the runway and which is thrown from the runway into the underside of the aircraft if the aircraft wheels run over or otherwise come into contact with that debris, although in this scenario the amount of debris in comparison to that produced by an actual tyre failure is significantly less.

In general if an aircraft experiences an engine failure during take off the pilot has two options, either keep accelerating and take off or apply the brakes, decelerate and stop. The speed at which this decision is made is termed V1. If the aircraft is travelling at a speed greater than V1 and an engine fails, the pilot chooses to continue to take off. If the aircraft is travelling at a speed below V1 he must stop using wheel brakes and air brakes. This latter option is referred to as a High Energy Rejected Take Off (HERTO). However, in aircraft configurations in which the engines are located rearward of the main landing gear, such as tail mounted engine configurations, in the event of a tyre failure there is an increased probability of debris flung from the tyres striking the engines and potentially causing a subsequent engine failure. This is referred to as a cascade failure. In these circumstances the braking effectiveness of the aircraft is reduced by virtue of the reduced effectiveness of the wheel brakes. This increases the risk associated with performing a high energy rejected take-off in aircraft with rear engines. It would therefore be beneficial to reduce the probability of engine damage arising from impact on the engine by tyre propelled debris.

According to a first aspect of the present invention there is provided an engine debris guard for preventing tyre propelled debris striking an aircraft engine, the debris guard comprising a guard bar pivotably connected to an aircraft main landing gear having at least one wheel and tyre assembly and arranged to be movable between a first position and a second position, wherein in the first position the guard bar extends laterally across the wheel and tyre assembly to intersect the trajectory between the wheel and tyre assembly and an engine of the aircraft of any tyre propelled debris.

Additionally, the guard bar may include an attachment arm pivotably connected to the main landing gear. Furthermore, the engine debris guard may further include a telescopic actuator connected between the attachment arm and the main landing gear, wherein operation of the telescopic actuator between a retracted and an extended position causes the guard bar to move between said first and second positions.

Additionally or alternatively, the engine debris guard may further include a resilient member arranged to bias the guard bar away from first position.

Additionally or alternatively, the engine debris guard may further include shock absorbing means arranged to permit movement of the engine debris guard away from the wheel and tyre assembly when struck by a piece of debris. The shock absorbing means may include a resilient member connected between the engine debris guard and the main landing gear. Alternatively. the shock absorbing means may include an attachment arm connecting the guard bar to the main landing gear, the attachment arm including an hinged section resiliently biased to resist hinging movement.

According to a further aspect of the present invention there is provided an aircraft having at least one engine mounted at the rear of the fuselage and including an engine debris guard according to any preceding claim.

Embodiments of the present invention are described in detail below, by way of illustrative example only, with reference to the accompanying figures, of which.

Figure 1:
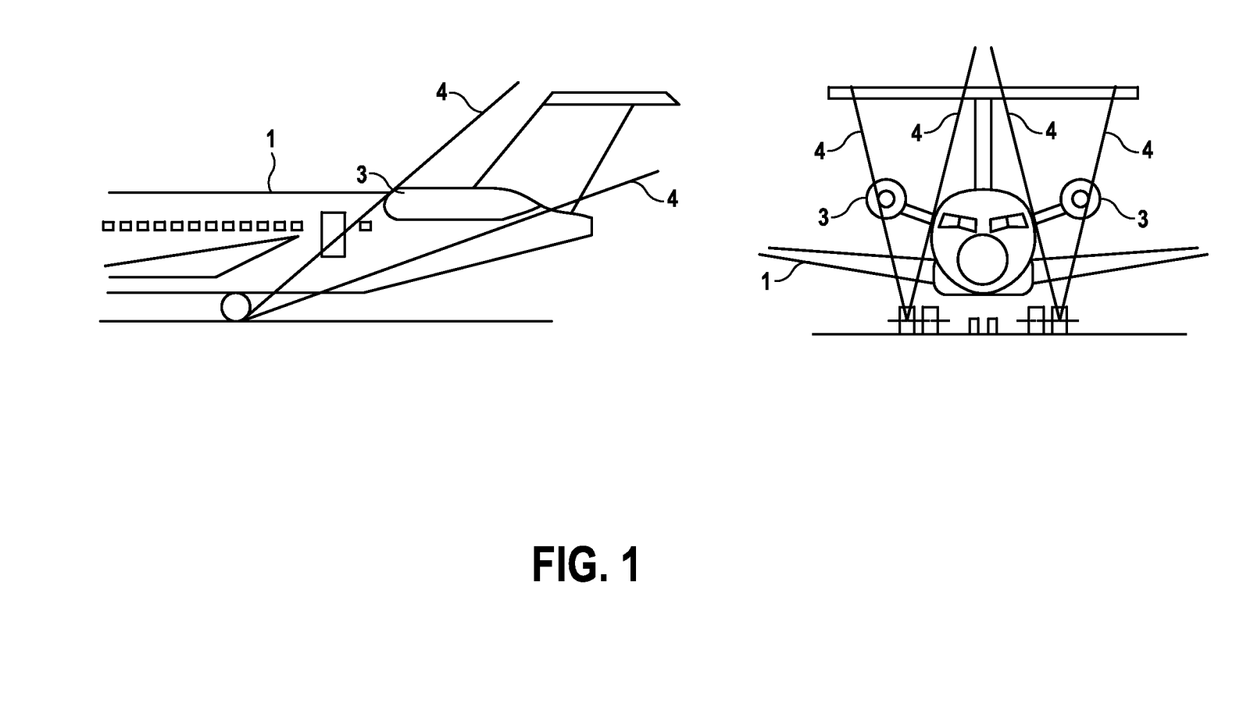
FIG. 1 schematically illustrates forward and side elevations of a rear engine aircraft showing the range of debris trajectories that would result in debris striking and engine.

FIG. 1 shows partial schematic side and front views of an aircraft 1 having rear mounted engines 3. Also illustrated, bound by solid lines 4, are the range of possible trajectories for debris originating from one of the wheels of the main landing gear of the aircraft 1 that would result in the debris striking one of the engines 3. It is debris with a trajectory within this range that the engine debris guard of embodiments of the present invention is intended to prevent from striking the engines.

Figure 2:
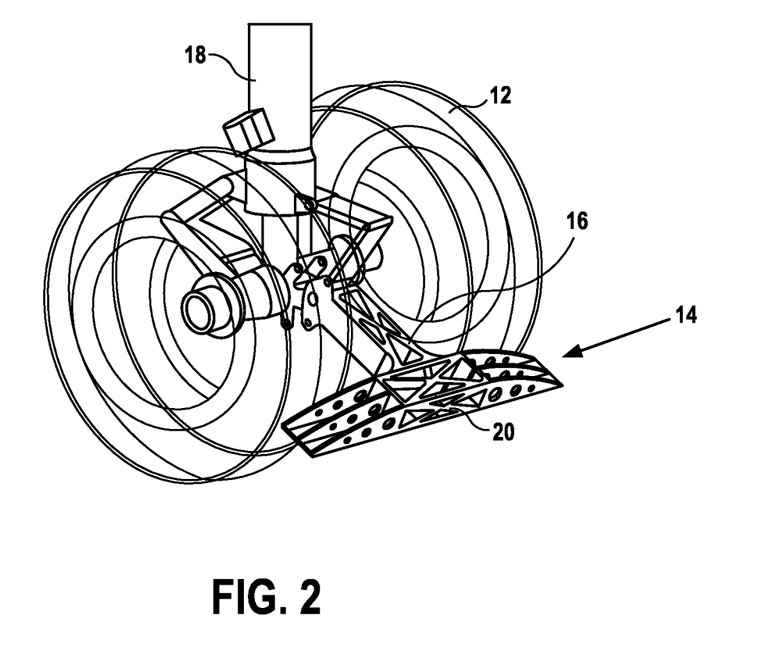
FIG. 2 is a perspective illustration of an aircraft main landing gear equipped with an engine debris guard according to an embodiment of the present invention.

FIG. 2 shows a schematic representation of an aircraft main landing gear 10, with tandem wheel and tyre assemblies 12, in combination with an engine debris guard 14 according to an embodiment of the present invention. The engine debris guard 14 includes an attachment arm 16 that is substantially elongate and is pivotably connected at one end to the lower part of the main landing gear leg 18. The attachment arm 16 is dimensioned so as to extend from the main landing gear leg between the two tyre/wheel assemblies 12 and to extend beyond the outer periphery, i.e. the ground contacting tread, of the tyres. The engine debris guard 14 also includes a guard bar 20. The guard bar 20 is connected to the end of the attachment arm 16 extending beyond the periphery of the tyres 12 and is a substantially elongate element that extends laterally across the width of both the tandem tyre and wheel assemblies 12. The guard bar 20 and attachment arm 16 preferably form a T-shaped element.

Figure 7:
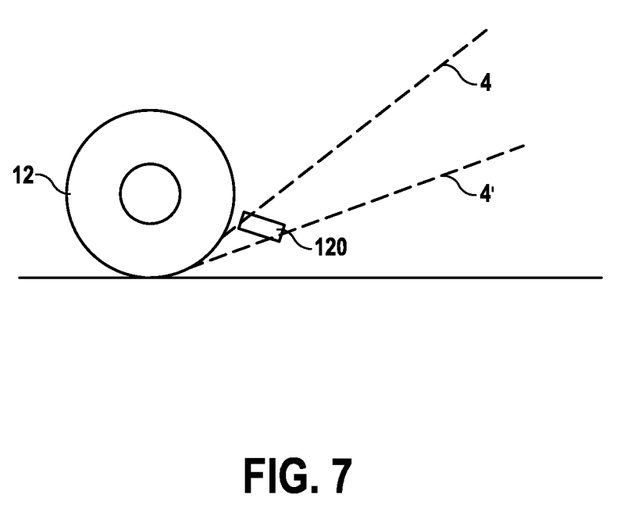
FIG. 7 schematically illustrates the trajectory cone for an aircraft tyre to be protected by embodiments of the present invention.

To provide complete protection of the aircraft engine from any tyre propelled debris, the guard bar 20 should preferably extend both laterally and longitudinally with respect to the tyre 12 fully across the "trajectory cone" in which an unimpeded piece of debris originating from the tyre and wheel assembly 12 will strike the aircraft engine. Referring to FIG. 7, the broken lines 4, 4' indicate the longitudinal extent of the "trajectory cone" from a tyre and wheel assembly 12. A possible arrangement of a guard bar 20 is illustrated extending fully across the cone. It will therefore be appreciated from FIG. 7 that the dimensions of the guard bar 20 will vary depending upon the extent to which the guard bar 20 extends from the tyre wheel assembly, which will be generally dictated by the length of the attachment arm 16, and also the angle subtended by the boundaries of the trajectory cone, i.e. the angle between broken lines 4 and 4', which will be dictated by the size of the aircraft engines and their position and distance relative to the tyre and wheel assemblies 12.

The engine debris guard 14 and in particular the guard bar 20, should preferably be engineered so as to be able to withstand impact from tyre debris of the varying sizes typical of "flailing tread", "tyre burst" and "tread shed" failures of the landing gear tyre. The engine debris guard must also be able to withstand multiple debris impacts without detachment from the aircraft or significant deformation, since not only is it likely that multiple pieces of debris will be generated on the failure of a tyre, but in addition it is quite common for the failure of one tyre of an aircraft landing gear to subsequently cause neighbouring tyres within the landing gear arrangement to also fail, either as a direct result of impact from debris from the first tyre failure or from increased forces being applied to the remaining tyres as a result of the original tyre failure. The exact shape and configuration of the debris guard 20 is therefore not fixed and is likely to vary depending upon the particular engineering solution selected, as well as the materials selected for the manufacturer of the debris guard.

Figure 3:
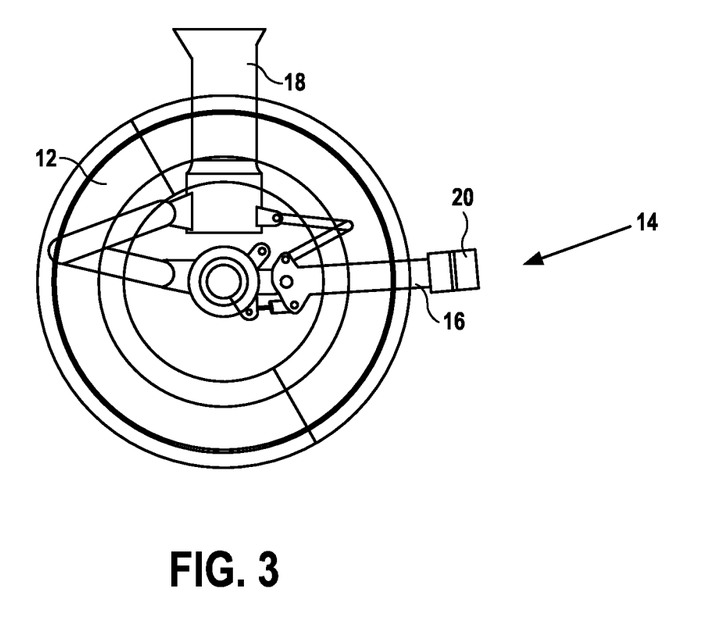
FIG. 3 is a schematic side elevation of the main landing gear and engine debris guard shown in FIG. 2.

Referring again to FIG. 2 and FIG. 7, it will be noted that the guard bar 20 is positioned generally well below the axle line of the tyre and wheel assembly 12. This is preferred so as to locate the guard bar within the smallest portion of the "trajectory zone" as possible so as to minimise the size and weight of the guard bar and overall engine debris guard. As a consequence, in this position the engine debris guard, and in particular the guard bar 20, are highly likely to strike the runway as the aircraft rotates during take-off or landing. Additionally, certain ground handling mechanisms used to physically manoeuvre an aircraft whilst on the runway, such as handling tractors, attach to the main landing gear and entire wheel assembly in the area in which the engine guard 20 would occupy. Consequently, in embodiments of the present invention the engine debris guard 14 is reversibly movable between a first, operational, position, as indicated in FIG. 2 and FIG. 7, and a second, stowed, position, as indicated in FIG. 3. As can be seen with reference to FIG. 3, in the stowed position the engine debris guard is angularly displaced from the deployed position towards the main landing gear leg. This allows both ground handling operations to occur and prevents the engine debris guard from striking the runway during take off and landing manoeuvres.

Figure 4:
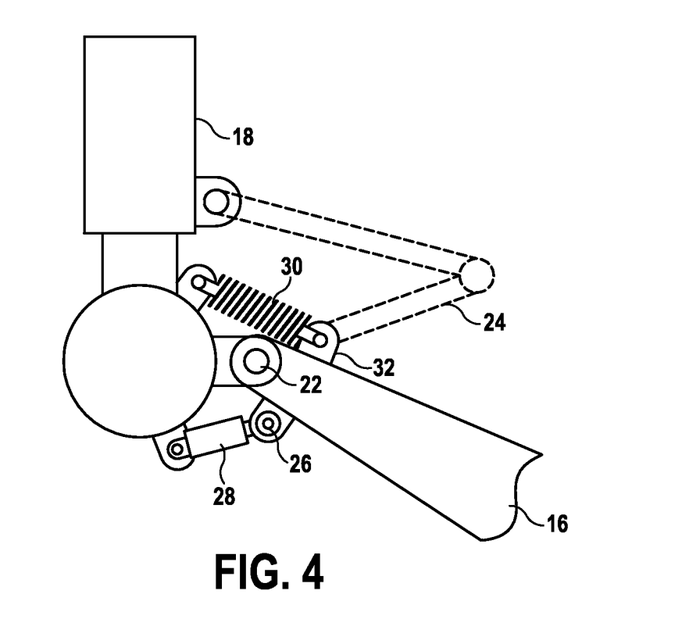
FIG. 4 is a further schematic illustration of part of a main landing gear and engine debris guard according to an embodiment of the present invention with the engine debris guard in a deployed position.
Figure 5:
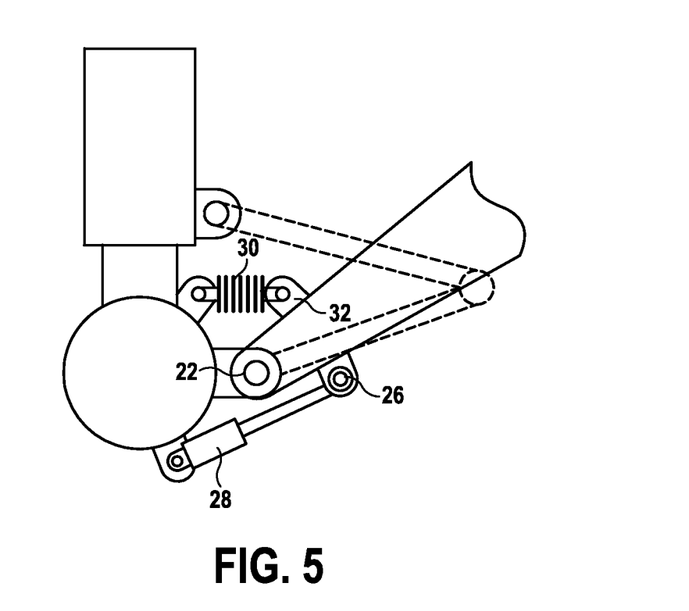
FIG. 5 is a corresponding schematic illustration of the main landing gear and engine debris guard portion shown in FIG. 4 with the engine debris guard shown in a retracted position.

To move the engine debris guard between the deployed and stowed positions an actuator is provided to pivot the engine debris guard about the point at which it is connected to the main landing gear leg 18. FIG. 4 schematically illustrates a possible actuator arrangement according to an embodiment of the present invention, with the engine debris guard being in the deployed position. Referring to FIG. 4 the attachment arm 16 of the engine debris guard is mounted to the bottom of the main landing gear leg 18 by means of a pivotable connection 22, as described previously with reference to FIG. 2. The wheel and tyre assemblies 12 shown in FIGS. 2 and 3 are not illustrated in FIG. 4 in the interests of clarity. The pivotable connection 22 may be the same pivot point to which the lower systems slave link 24 is attached. The function and design of the system slave link will be known to the person skilled in the art and does not fall within the scope of the present application. A second pivot point 26 is provided on the attachment arm 16 longitudinally displaced from the first pivot point 22. One end of a telescopic actuator 28 is pivotably connected to the second pivot point 26, whilst the opposite end of the actuator 28 is pivotably connected to a further pivot point on the main landing gear leg. Suitable telescopic actuators, such as a hydraulically operated piston, will be readily apparent to the person skilled in the art. In FIG. 4 the telescopic actuator 28 is at its minimum extension, thus causing the attachment arm 16 of the engine debris guard to be drawn downwards into the deployed position relative to the upper sections of the main landing gear leg 18 and systems slave link 24. FIG. 5 schematically illustrates the engine debris guard and main landing gear in an analogous fashion to FIG. 4 but with the engine debris guard being in the stowed position. This is achieved by operating the telescopic actuator 28 such that the actuator is in an extended position, which thus pushes the lower pivot point 26 of the attachment arm 16 away from the bottom of the main landing gear leg such that the attachment arm 16 and therefore the engine debris guard as a whole is rotated upwards about the first pivot point 22 into the stowed position. It will be appreciated by the skilled person that other actuator mechanisms may equally be used in alternative embodiments. For example, a rotary actuator may be provided arranged to rotate the engine debris guard about a pivot point on the landing gear leg or wheel axle.

In the particular embodiment illustrated in FIGS. 4 and 5 a return spring—multiple springs/2nd actuator 30 is provided connected between a third pivot point 32 on the attachment arm 16 of the debris guard, the third attachment point 32 also being longitudinally displaced from the main pivot connection 22 of the attachment arm and also being connected to a further upper attachment point on the main landing gear leg 18. When the engine debris guard is in the deployed position, as illustrated in FIG. 4, the return spring 30 is in an extended state. The spring 30 is sized such that in the event of the telescopic actuator 28 failing the spring 30 has sufficient compressive force to retract the attachment arm 16 and engine debris guard into the stowed position, as illustrated in FIG. 5. The spring 30 also functions to assist the telescopic actuator 28 in normal usage, thus allowing the actuator to be smaller and therefore lighter than if no spring was present. In addition to assisting the actuator 28, the function of the spring is to provide a fail safe safety mechanism to ensure that any failure in the engine debris guard actuator mechanism causes the engine debris guard to return to the stowed position.

In alternative embodiments the return spring function may be implemented using multiple springs or using a second actuator that is energised in the event of the failure of the primary actuator 28. Whilst it is likely that such a safety feature will be required by the relevant regulatory and safety bodies, it will be appreciated that embodiments of the present invention could implemented without such a safety spring 30 or equivalent if so desired and permitted.

Figure 6:
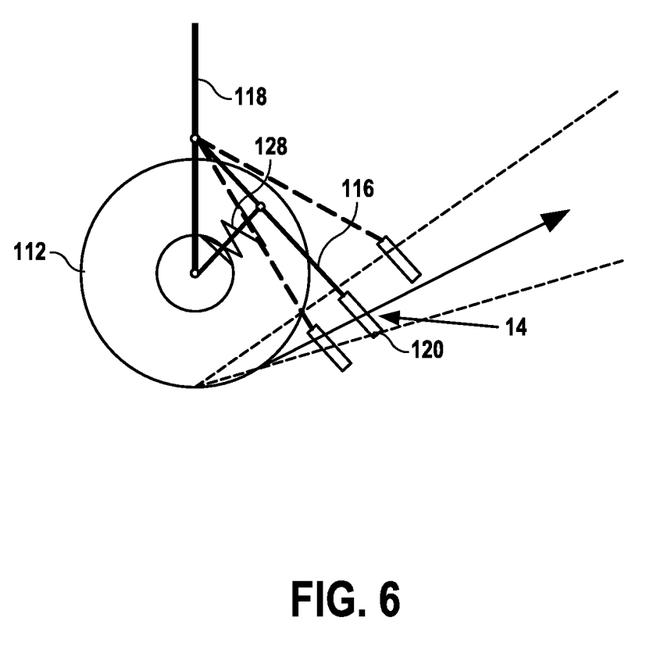
FIG. 6 schematically illustrates a further embodiment of an engine debris guard according to the present invention.

FIG. 6 schematically illustrates a further embodiment of the present invention. The engine debris guard again includes a guard bar 20 arranged to intersect the possible debris trajectories from the aircraft wheel and tyre assembly 112, the guard bar 120 being connected to an attachment arm 116 at one end, either end of the attachment bar being pivotably connected to the main landing gear leg 118. However, in the embodiment shown in FIG. 6 the attachment bar 116 is attached to the main landing leg 118 at an upper portion of the leg, such that the attachment bar 116 has a greater length than that of the first embodiment shown in FIGS. 2 to 5. A telescopic actuator 128 is pivotably connected at one end to a lower section of the main landing gear leg 118 and its other end to a point on the attachment arm 116 at a point between the two ends of the attachment arm.

In embodiments of the present invention operation of the telescopic actuator to move the engine debris guard between deployed and stowed positions will be under the control of a specific engine debris guard operating system, the design and implementation of which falls outside the scope of this application. However, it is envisaged that operation of the engine debris guard may include a combination of automatic and manual operating modes. For example, it is probable that an automatic deployment system will be used in conjunction with appropriate sensors to automatically move the engine debris guard from the deployed position to the stowed position either immediately prior to, or on commencement of, rotation of the aircraft during take-off so as to avoid the guard bar of the engine debris guard from striking the runway as the aircraft rotates. Similarly, such a system would control the deployment of the engine debris guard from the stowed position to the deployed position immediately after touch down of the aircraft during landing. The automatic system may further automatically retract the engine debris guard to the stowed position when the aircraft is taxiing or stationary to facilitate ground handling of the aircraft. Alternatively or additionally, a mechanism may be provided to allow the engine debris guard to be moved into the stowed position as a result of a manual intervention by ground handling staff. This may be accomplished, for example, by the inclusion of an override switch either on the main landing gear or in the immediate vicinity and reachable by a person stood on the runway next to the aircraft.

An additional feature that may be included in some embodiments of the present invention is a shock absorbing mechanism to allow the engine debris guard to move about its mounting points in response to either coming into contact with the ground unintentionally, for example during rotation of the aircraft during take-off or landing, or to facilitate absorption of the impact forces generated when the engine debris guard is struck by tyre propelled debris. This shock absorbing facility may, for example, be integrated into the function of the telescopic actuator 28, 128 in the embodiment shown in FIGS. 2-5 and FIG. 6, for example by mounting a shock absorbing spring over the body of the actuator and arranging for the actuator to be de-coupled from its driving energy source such that at least a minimum degree of telescopic movement is permitted. For example, this may be accomplished by depressurising the hydraulic circuit in the event of the actuator being hydraulically operated such that the hydraulic fluid behaves as a damping fluid. Alternatively, for example, the shock absorbing function may be provided by encompassing a jointed link in the attachment arm 16, 116 of the engine debris guard and a resilient biasing member, such as a torsion or flexure spring designed to allow the attachment arm to flex about the central pivot point only when placed under a force above a certain magnitude, that force corresponding to the force expected to be experienced by the debris guard when it either strikes the ground or is struck by flying debris. In a further alternative embodiment the entire attachment arm of the engine debris guard may be manufactured from a semi-flexible material or constructed in such a manner as to provide the necessary degree of flex.

In all embodiments of the present invention an engine debris guard is provided that when deployed substantially blocks the trajectory of any flying debris originating from the aircraft wheel and tyres, yet allows the engine debris guard to be moved between deployed and stowed positions so as to avoid contact with the ground during aircraft rotation at landing and take-off avoid obstructing ground handling operations and also to facilitate the stowage of the engine debris guard when the main landing gear is retracted within the landing gear bay of the aircraft when the aircraft is in flight.

The invention claimed is:

1. An engine debris guard for preventing tire propelled debris striking an aircraft engine, the debris guard comprising a guard bar pivotably connected to an aircraft main landing gear having at least one wheel and tire assembly having an axle line, the guard bar being arranged to be movable between a first position wherein the guard bar is generally below the axle line and a second position arranged to prevent the guard bar from striking a runway during take-off and landing maneuvers of the aircraft, wherein in the first position the guard bar extends laterally across the wheel and tire assembly to intersect the possible trajectories between the wheel and tire assembly and an engine of the aircraft of any tire propelled debris, wherein the guard bar is at least one of adapted to be moved from the first position to the second position during take-off manoeuvres of the aircraft or adapted to be moved from the second position to the first position during landing manoevres of the aircraft, and wherein the engine debris guard is at least one of adapted to automatically move the guard bar from the first position to the second position or to automatically move the guard bar from the second position to the first position.

2. An engine debris guard according to claim 1, wherein the debris guard is arranged to partially rotate with respect to the main landing gear.

3. An engine debris guard according to claim 1, wherein the guard bar includes an attachment arm pivotably connected to the main landing gear.

4. An engine debris guard according to claim 3 further comprising an actuator connected between the attachment arm and the main landing gear, wherein operation of the actuator causes the guard bar to move between said first and second positions.

5. An engine debris guard according to claim 1 further comprising a resilient member arranged to bias the guard bar away from first position.

6. An engine debris guard according to claim 1 further comprising shock absorbing means arranged to permit movement of the engine debris guard away from the wheel and tire assembly when struck by a piece of debris.

7. An engine debris guard according to claim 6, wherein the shock absorbing means comprises a resilient member connected between the engine debris guard and the main landing gear.

8. An engine debris guard according to claim 6, wherein the shock absorbing means comprises an attachment arm connecting the guard bar to the main landing gear, the attachment arm including an hinged section resiliently biased to resist hinging movement.

9. An aircraft having at least one engine mounted at the rear of the fuselage and including an engine debris guard according to claim 1.

10. An engine debris guard according to claim 1, wherein in the first position the guard bar is located behind the axle line with respect to a longitudinal direction of the aircraft.

11. An engine debris guard according to claim 10, wherein in the first position the guard bar is located behind the periphery of the tire with respect to a longitudinal direction of the aircraft.

12. An aircraft according to claim 10, wherein the guard bar extends both laterally and longitudinally substantially across a trajectory cone in which an unimpeded piece of debris originating from the wheel and tire assembly will strike the aircraft engine.

13. An engine debris guard according to claim 1, further comprising an actuator configured to move the guard bar from the first position to the second position.

14. An engine debris guard according to claim 1, wherein in the first position the guard bar is located generally below the axle line and generally aft of the axle line with respect to the direction of forward movement of the aircraft.

15. An engine debris guard according to claim 1, wherein the engine debris guard is adapted to enable manual movement of the guard bar from the first position to the second position, and wherein the engine debris guard is adapted to enable manual movement of the guard bar from the second position to the first position.

16. An aircraft including an engine debris guard according to claim 1, wherein the engine debris guard is movable from the first position to the second position via an actuator.

17. An engine debris guard for preventing tire propelled debris striking an aircraft engine, the debris guard comprising a guard bar pivotably connected to an aircraft main landing gear having at least one wheel and tire assembly having an axle line, the guard bar being arranged to be movable between a first position wherein the guard bar is generally below the axle line and a second position arranged to prevent the guard bar from striking a runway during take-off and landing maneuvers of the aircraft, wherein in the first position the guard bar extends laterally across the wheel and tire assembly to intersect the possible trajectories between the wheel and tire assembly and an engine of the aircraft of any tire propelled debris; and wherein the guard bar is at least one of moved from the first position to the second position during take-off maneuvers or moved from the second position to the first position during landing maneuvers.

18. An engine debris guard according to claim 17 further comprising a resilient member arranged to bias the guard bar away from first position.

19. An engine debris guard according to claim 17 further comprising shock absorber arranged to permit movement of the engine debris guard away from the wheel and tire assembly when struck by a piece of debris.

20. An engine debris guard according to claim 19, wherein the shock absorber comprises a resilient member connected between the engine debris guard and the main landing gear.

21. An engine debris guard according to claim 19, wherein the shock absorber comprises an attachment arm connecting the guard bar to the main landing gear, the attachment arm including an hinged section resiliently biased to resist hinging movement.

22. An aircraft having at least one engine mounted at the rear of the fuselage and including an engine debris guard according to claim 17.

23. An aircraft according to claim 22, wherein the guard bar extends both laterally and longitudinally substantially across a trajectory cone in which an unimpeded piece of debris originating from the wheel and tire assembly will strike the aircraft engine.

24. An engine debris guard according to claim 17, further comprising an actuator configured to move the guard bar from at least one of the first position to the second position or from the second position to the first position.

25. An engine debris guard according to claim 17, wherein in the first position the guard bar is located generally below the axle line and generally aft of the axle line with respect to the direction of forward movement of the aircraft.

26. An engine debris guard according to claim 17, wherein the engine debris guard is at least one of adapted to automatically move the guard bar from the first position to the second position or adapted to automatically move the guard bar from the second position to the first position.

27. An engine debris guard according to claim 26, wherein the engine debris guard is adapted to enable manual movement of the guard bar from the first position to the second position, and wherein the engine debris guard is adapted to enable manual movement of the guard bar from the second position to the first position.

28. An engine debris guard according to claim 17, wherein in the first position the guard bar is located behind the periphery of the tire with respect to a longitudinal direction of the aircraft.

* * * * *

UNITED STATES PATENT AND TRADEMARK OFFICE
CERTIFICATE OF CORRECTION

| | | |
|---|---|---|
| PATENT NO. | : 8,899,518 B2 | Page 1 of 1 |
| APPLICATION NO. | : 13/127616 | |
| DATED | : December 2, 2014 | |
| INVENTOR(S) | : Chris Foster et al. | |

It is certified that error appears in the above-identified patent and that said Letters Patent is hereby corrected as shown below:

On the title page, the International PCT Filing information should read as follows:

(22) PCT Filed: Nov. 5, 2008

Signed and Sealed this
Fourth Day of August, 2015

Michelle K. Lee
*Director of the United States Patent and Trademark Office*